United States Patent Office 3,406,174
Patented Oct. 15, 1968

3,406,174
BENZYLSULFAMIDES
William J. Houlihan, Mountain Lakes, N.J., assignor to Sandoz Inc., Hanover, N.J.
No Drawing. Continuation-in-part of application Ser. No. 339,354, Jan. 22, 1964. This application July 5, 1966, Ser. No. 562,463
38 Claims. (Cl. 260—268)

This application is a continuation-in-part of Ser. No. 339,354, filed Jan. 22, 1964 (now abandoned), of Ser. No. 375,288, filed June 15, 1964, now U.S. Patent 3,320,-314, and of Ser. No. 406,184, filed Oct. 23, 1964, now abandoned.

The invention is directed to pharmaceutically acceptable benzyl sulfamides of the formula

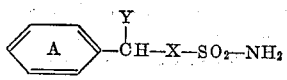

I wherein

Y is either a hydrogen atom (—H) or R;

R is either a straight chain alkyl having from 1 to 4 carbon atoms, i.e. methyl, ethyl, propyl and butyl; a phenyl radical having from zero to four substituents on the phenyl ring, e.g. phenyl and p-toyl; or a benzyl radical having from zero to four substituents on the benzene ring, e.g. benzyl and 3,5-dichlorobenzyl; the ring of both the phenyl radical and the benzyl radical being unsubstituted in the 6-position, and each substituent being either lower alkyl, e.g. methyl, ethyl, propyl, isopropyl and butyl; lower alkoxy, e.g. methoxy, ethoxy, propoxy, isopropoxy and butoxy; di(lower)alkylamino, each alkyl of which has from one to four carbon atoms, e.g. N-ethyl-N-methylamino; fluoro (—F); chloro (—Cl); bromo (—Br); trifluoromethyl (—CF$_3$) with the proviso that a plurality of trifluoromethyl groups are not ortho to each other; or, together with its counterpart on an adjacent ring carbon atom, methylenedioxy (—O—CH$_2$—O—);

Ring A has from zero to five substituents, but has at least one substituent when Y is hydrogen and X is —NH— and is unsubstituted in the 6-position when Y is other than hydrogen and/or X is other than —NH— or —N(CH$_3$)—, each substituent being either lower alkyl, e.g. methyl, ethyl, propyl, isopropyl and butyl; lower alkoxy, e.g. methoxy, ethoxy, propoxy, isopropoxy and butoxy; di(lower)alkylamino, each alkyl of which has from one to four carbon atoms, e.g. dimethylamino; fluoro (—F); chloro (—Cl); bromo (—Br); trifluoromethyl (—CF$_3$) with the proviso that a plurality of trifluoromethyl groups are not ortho to each other; or, together with its counterpart on an adjacent ring carbon atom, methylenedioxy (—O—CH$_2$—O—);

X is either —N(R')—, e.g. —N(ethyl)—, or

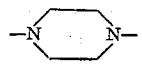

and

R' is either a hydrogen atom (—H) or lower alkyl, e.g. methyl, ethyl, propyl, isopropyl and butyl.

There are five main groups of compounds:

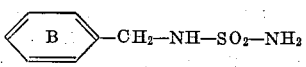

II

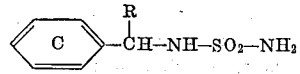

III

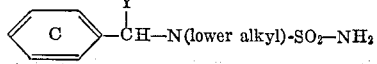

IV

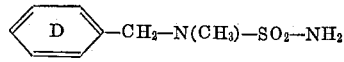

V

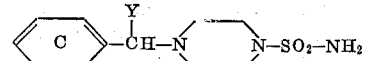

VI wherein

Y and R are as hereinbefore defined;

ring B is ring A having from one to five substituents, preferably including at least one chloro substituent;

ring C is ring A having from zero to four substituents and being unsubstituted in the 6-position; and ring D is ring A substituted in at least the 2- and the 6-position and having at most two additional substituents.

A preferred subclass of compounds comprises these compound I wherein ring A has at least one chloro substituent.

Those compounds I wherein R is not identical with ring A exist either as optically active stereoisomers or as mixtures thereof, including racemic mixtures. Optically active stereoisomers are prepared either by starting with an optically active α-substituted benzylamine or by resolving the final product (racemic mixture) by methods well-known to the art-skilled.

The preparation of compounds I' (compounds I wherein X is other than —NH—) is accomplished by heating (a) a secondary benzyl amine VII and (b) sulfamide VIII

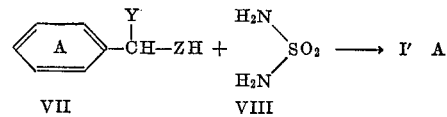

wherein

Y and ring A have their hereinbefore-ascribed significance, and

Z is either —N(lower alkyl)—, e.g. —N(CH$_3$)—, or

at a temperature within the range of from about 50° to about 250° C. and in an inner solvent medium. A reaction temperature in excess of 50° C. is recommended, and a preferred range is from about 55° to about 125° C. Ordinarily the reaction is effected under reflux. Agitation may be employed during the reaction, but none is required.

The inert solvent medium is either water; a lower alkanol, e.g. ethanol; a mixture of the two, e.g., water and ethanol; or a tertiary amine. Contemplated tertiary amines include, for example, tri(lower)alkylamines, e.g. triethylamine; aryldi(lower)alkylamines, e.g. phenyldimethylamine; N-(lower)alkyl pyrroles, e.g. N-propyl-pyrrole; pyrridine; (lower)alkyl pyridines, e.g. 3-ethyl pyridine; (lower)alkoxy pyridines, e.g. 2,5-dimethoxy-pyridine; quinoline; (lower)alkyl quinolines, e.g. 8-ethyl-quinoline; (lower)alkoxy quinolines, e.g. 3,5-dimethoxy-quinolines; N-(lower)alkyl morpholine, e.g. N-methyl-morpholine; N-aryl-morpholine, e.g. N-phenyl-morpholine; N,N'-di-(lower)alkyl piperazine, e.g. N-methyl, N'-ethyl-piperazine.

For the preparation of compounds I" (compounds I wherein X is —NH—) similar reaction conditions are employed. A primary benzyl amine IX is substituted for the secondary benzyl amine VII, and the reaction medium is an aqueous ethanolic medium:

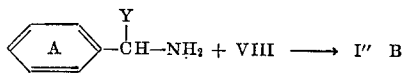

IX

Compounds VII and IX are prepared from known starting materials according to standard art-recognized procedures.

Compounds I are anticonvulsants except for compounds IV wherein Y is R; the latter display a reversal of activity, e.g. stimulant, analeptic and analgesic activity as well as anti-inflammatory activity. All compounds I may be administered (for their noted indications) either orally or parenterally in a standard dosage form, e.g. a tablet or capsule. The average daily dose varies from 15 to 300 milligrams, which may be administered in equal divided doses from two to four times a day.

Each of the pharmaceutically active compounds of this invention, may be, e.g. incorporated, for oral administration, in a tablet as the sole active ingredient. A typical tablet is constituted by from 1 to 3 percent binder, e.g. tragacanth; from 3 to 10 percent disintegration agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

|  | Parts |
|---|---|
| Title compound of Example 3 | 33 |
| Tragacanth | 2 |
| Lactose | 56.5 |
| Corn starch | 5 |
| Talcum | 3 |
| Magnesium stearate | 0.5 |
| Alcohol SD–30 | Q.s. |
| Purified water | |

The following examples illustrate the invention, all temperatures being in degrees centigrade, the parts and percentages being by weight unless otherwise specified, and the relationship between parts by weight and parts by volume being the same as that between the kilogram and the liter.

Example 1.—N-isopropyl-N-benzylsulfamide

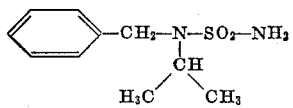

In a flask equipped with a stirrer and a condenser attached to a bubble detector dissolve 13.3 parts (0.09 mole) of N-benzylisopropylamine and 7.2 parts (0.08 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, melting point (M.P.) 92° to 94°.

Replacing the N-benzylisopropylamine with an equivalent of either N-ethyl-o-methylbenzylamine, N-(3-ethyl-4-fluorobenzyl)propylamine or N-butyl-5-chloro-4-propyl-2-trifluoromethylbenzylamine results in the preparation, in similar manner, of N-ethyl-N-(o-methylbenzyl)sulfamide, N-(3-ethyl-4-fluorobenzyl)-N-propylsulfamide or N - butyl-N-(5-chloro-4-propyl-2-trifluoromethylbenzyl)-sulfamide, respectively.

Example 2.—N-methyl-N-(4-methoxybenzyl)sulfamide

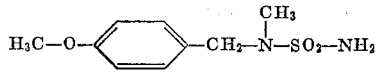

In a flask equipped with a stirrer and a condenser attached to a bubble detector dissolve 12.1 parts (0.08 mole) of N-methyl-p-methoxybenzylamine and 5.8 parts (0.06 mole) of sulfamide in 100 parts by volume of pyridine. Stir and reflux the resulting solution until gassing is no longer detected in the bubble detector. Remove the solvent (pyridine) in vacuo on a rotary evaporator to obtain the title compound, M.P. 133° to 134°.

Replacing the N-methyl-p-methoxybenzylamine with an equivalent of each of the following benzylamines results in the preparation, in similar manner, of the corresponding indicated benzylsulfamide:

| Benzylamine | Sulfamide |
|---|---|
| N-(3,4-dibromobenzyl) methylamine. | N-(3,4-dibromobenzyl)-N-methylsulfamide. |
| N-(2-chloro-4-ethyl-5-fluorobenzyl)ethylamine. | N-(2-chloro-4-ethyl-5-fluorobenzyl)-N-ethylsulfamide. |
| N-(3,5-ditrifluoromethylbenzyl) propylamine. | N-(3,5-ditrifluoromethylbenzyl)-N-propylsulfamide. |
| N-(2-methylbenzyl) methylamine. | N-(2-methylbenzyl)-N-methylsulfamide. |
| N-(3-ethyl-4-fluorobenzyl) ethylamine. | N-(3-ethyl-4-fluorobenzyl)-N-ethylsulfamide. |
| N-(5-chloro-4-propyl-2-trifluoromethylbenzyl)propylamine. | N-(5-chloro-4-propyl-2-trifluoromethylbenzyl)-N-propylsulfamide. |
| N-(2-bromo-4-ethoxy-5-isopropyl-3-trifluoromethlybenzyl) methylamine. | N-(2-bromo-4-ethoxy-5-isopropyl-3-trifluoromethylbenzyl)-N-methylsulfamide. |
| N-ethyl-2-butyl-3-fluoro-5-isopropoxybenzylamine. | N-ethyl-N-(2-butyl-3-fluoro-5-isopropoxybenzyl)sulfamide. |

Example 3.—N-methyl-N-(4-chlorobenzyl)sulfamide

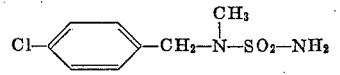

In a flask equipped with a stirrer and a condenser attached to a bubble detector dissolved 12.5 parts (0.08 mole) of N-methyl-p-chlorobenzylamine and 5.8 parts (0.06 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 132° to 133°.

Replacing the N-methyl-p-chlorobenzylamine with an equivalent of each of the following benzylamines results in the preparation, in similar manner, of the corresponding indicated benzylsulfamide:

| Benzylamine | Sulfamide |
|---|---|
| N-(3-amyl-2-propoxybenzyl) propylamine. | N-(3-amyl-2-propoxybenzyl)-N-propylsulfamide. |
| N-(3-bromo-5-butoxy-4-trifluoromethylbenzyl)methylamine. | N-(3-bromo-5-butoxy-4-trifluoromethylbenzyl)-N-methylsulfamide. |
| N-ethyl-2-fluoro-4-pentoxy-benzylamine. | N-ethyl-N-(2-fluoro-4-pentoxybenzyl)sulfamide. |
| N-(3-chloro-4,5-methylenedioxybenzyl)propylamine. | N-(3-chloro-4,5-methylenedioxybenzyl)-N-propylsulfamide. |
| N-(3,4-dibromobenzyl) methylamine. | N-(3,4-dibromobenzyl)-N-methylsulfamide. |
| N-(2-chloro-4-ethyl-5-fluorobenzyl)ethylamine. | N-(2-chloro-4-ethyl-5-fluorobenzyl)-N-ethylsulfamide. |
| N-(2,4-ditrifluoromethyl-3-methoxybenzyl)propylamine. | N-(2,4-ditrifluoromethyl-3-methoxybenzyl)-N-propylsulfamide. |
| N-(3,5-ditrifluoromethylbenzyl) methylamine. | N-(3,5-ditrifluoromethylbenzyl)-N-methylsulfamide. |

Example 4.—N-methyl-N-(3,4-methylenedioxybenzyl)-sulfamide

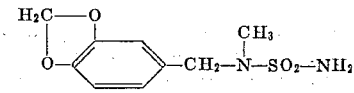

In a flask equipped with a stirrer and a condenser attached to a bubble detector dissolve 13.2 parts (0.08 mole) of N-methyl-3,4-methylenedioxybenzylamine and 5.8 parts (0.06 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 127° to 128°.

Replacing the N-methyl-3,4-methylenedioxybenzylamine with an equivalent of each of the following benzylamines results in the preparation, in similar manner, of the corresponding indicated benzylsulfamide:

| Benzylamine | Sulfamide |
| --- | --- |
| N-(2-bromo-4-ethyl-5-isopropyl-3-trifluoromethylbenzyl)ethylamine. | N-(2-bromo-4-ethyl-5-isopropyl-3-trifluoromethylbenzyl)-N-ethylsulfamide. |
| N-(2-butyl-3-fluoro-5-isopropoxybenzyl)propylamine. | N-(2-butyl-3-fluoro-5-isopropoxybenzyl)-N-propylsulfamide. |
| N-(3-amyl-2-propoxybenzyl)-methylamine. | N-(3-amyl-2-propoxybenzyl)-N-methylsulfamide. |
| N-methyl-2,3,4,5-tetrachlorobenzylamine. | N-methyl-N-(2,3,4,5-tetrachlorobenzyl)-sulfamide. |
| N-propyl-2,3,4-trichlorobenzylamine. | N-propyl-N-(2,3,4-trichlorobenzyl)sulfamide. |
| N-ethyl-2,3,5-trichlorobenzylamine | N-ethyl-N-(2,3,5-trichlorobenzyl)sulfamide. |
| N-isopropyl-3-methyl-2,4,5-trichlorobenzylamine. | N-isopropyl-N-(3-methyl-2,4,5-trichlorobenzyl)sulfamide. |

Example 5.—N-methyl-N-benzylsulfamide

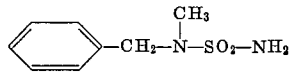

In a flask equipped with a stirrer and a condenser attached to a bubble detector dissolve 8.1 parts (0.067 mole) of N-methylbenzylamine and 2.4 parts (0.025 mole) of sulfamide in 50 parts by volume of pyridine. Stir and reflux the resulting solution until gassing is no longer detected in the bubble detector. Remove the solvent (pyridine) in vacuo on a rotary evaporator. Crystalline the viscous residue from methanol/water to obtain the title compound, M.P. 91° to 92°.

Replacing the N-methylbenzylamine with an equivalent of each of the following benzylamines results in the preparation, in similar manner, of the corresponding indicated benzylsulfamide:

| Benzylamine | Sulfamide |
| --- | --- |
| N-(3-bromo-5-butoxy-4-trifluoromethylbenzyl)methylamine. | N-(3-bromo-5-butoxy-4-trifluoromethylbenzyl)-N-methylsulfamide. |
| N-ethyl-2-fluoro-4-pentoxybenzylamine. | N-ethyl-N-(2-fluoro-4-pentoxybenzyl)sulfamide. |
| N-(3-chloro-4,5-methylenedioxybenzyl)propylamine. | N-(3-chloro-4,5-methylenedioxybenzyl)-N-propylsulfamide. |
| N-ethyl-3,4,5-trichlorobenzylamine. | N-ethyl-N-(3,4,5-trichlorobenzyl)sulfamide. |
| N-propyl-2,3,4,5-tetrachlorobenzylamine. | N-propyl-N-(2,3,4,5-tetrachlorobenzyl)-sulfamide. |
| N-butyl-3,4,5-trichlorobenzylamine. | N-butyl-N-(3,4,5-trichlorobenzyl)sulfamide. |
| N-butyl-2,3,4,5-tetrachlorobenzylamine. | N-butyl-N-(2,3,4,5-tetrachlorobenzyl)sulfamide. |

Example 6.—N-methyl-N-(2,4-dichlorobenzyl)sulfamide

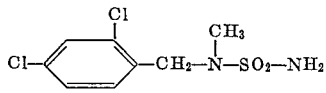

In a flask equipped with a stirrer and a condenser attached to a bubble detector dissolve 19.0 parts (0.10 mole) of N-methyl-2,4-dichlorobenzylamine and 9.6 parts (0.10 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 113° to 115°.

Replacing the N-methyl-2,4-dichlorobenzylamine with an equivalent of each of the following benzylamines results in the preparation, in similar manner, of the corresponding indicated benzylsulfamide:

| Benzylamine | Sulfamide |
| --- | --- |
| N-m-chlorobenzylmethylamine | N-(m-chlorobenzyl)-N-methylsulfamide. |
| N-p-chlorobenzylmethylamine | N-(p-chlorobenzyl)-N-methylsulfamide. |
| N-(2,3-dichlorobenzyl)methylamine | N-(2,3-dichlorobenzyl)-N-methylsulfamide. |
| N-(2,5-dichlorobenzyl)methylamine | N-(2,5-dichlorobenzyl)-N-methylsulfamide. |
| N-(3,5-dichlorobenzyl)methylamine | N-(3,5-dichlorobenzyl)-N-methylsulfamide. |
| N-methyl-2,3,4-trichlorobenzylamine. | N-methyl-N-(2,3,4-trichlorobenzyl)sulfamide. |
| N-methyl-2,3,5-trichlorobenzylamine. | N-methyl-N-(2,3,5-trichlorobenzyl)sulfamide. |
| N-methyl-2,4,5-trichlorobenzylamine. | N-methyl-N-(2,4,5-trichlorobenzyl)sulfamide. |
| N-methyl-3,4,5-trichlorobenzylamine. | N-methyl-N-(3,4,5-trichlorobenzyl)sulfamide. |

Example 7.—N-methyl-N-o-chlorobenzylsulfamide

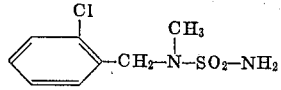

In a flask equipped with a stirrer and a condenser attached to a bubble detector dissolve 12.5 parts (0.08 mole) of N-methyl-o-chlorobenzylamine and 5.8 parts (0.06 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 112° to 113°.

Replacing the N-methyl-o-chlorobenzylamine with an equivalent of each of the following benzylamines results in the preparation, in similar manner, of the corresponding indicated benzylsulfamide:

| Benzylamine | Sulfamide |
| --- | --- |
| N-(3-chloro-2-fluoro-4-isopropylbenzyl)methylamine. | N-(3-chloro-2-fluoro-4-isopropylbenzyl)-N-methylsulfamide. |
| N-(4-chloro-3-fluoro-2-methoxybenzyl)ethylamine. | N-(4-chloro-3-fluoro-2-methoxybenzyl)-N-ethylsulfamide. |
| N-(2,3-dichloro-5-isopropoxybenzyl)-propylamine. | N-(2,3-dichloro-5-isopropoxybenzyl)-N-propylsulfamide. |
| N-(2-chloro-3,5-difluorobenzyl)-methylamine. | N-(2-chloro-3,5-difluorobenzyl)-N-methylsulfamide. |
| N-(2,4-dichloro-3-methoxybenzyl)-ethylamine. | N-(2,4-dichloro-3-methoxybenzyl)-N-ethylsulfamide. |
| N-(2,5-dichloro-4-fluorobenzyl)-propylamine. | N-(2,5-dichloro-4-fluorobenzyl)-N-propylsulfamide. |
| N-(5-butyl-3,4-dichlorobenzyl)isopropylamine. | N-(5-butyl-3,4-dichlorobenzyl)-N-isopropylsulfamide. |
| N-(p-dimethylaminobenzyl)-methylamine | N-(p-dimethylaminobenzyl)-N-methylsulfamide. |

Example 8.—N-methyl-N-(3,4-dichlorobenzyl)sulfamide

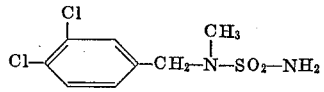

In a flask equipped with a stirrer and a condenser attached to a bubble detector dissolve 15.0 parts (0.08 mole) of N-(3,4-dichlorobenzyl)methylamine and 7.5 parts (0.08 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 92° to 93°.

Replacing the N-(3,4-dichlorobenzyl)methylamine with an equivalent of each of the following benzylamines results in the preparation, in similar manner, of the corresponding indicated benzylsulfamide:

| Benzylamine | Sulfamide |
| --- | --- |
| N-butyl-o-chlorobenzylamine | N-butyl-N-(o-chlorobenzyl)sulfamide. |
| N-butyl-m-chlorobenzylamine | N-butyl-N-(m-chlorobenzyl)sulfamide. |
| N-butyl-p-chlorobenzylamine | N-butyl-N-(p-chlorobenzyl)sulfamide. |
| N-butyl-2,3-dichlorobenzylamine | N-butyl-N-(2,3-dichlorobenzyl)sulfamide. |
| N-butyl-2,4-dichlorobenzylamine | N-butyl-N-(2,4-dichlorobenzyl)sulfamide. |
| N-butyl-2,5-dichlorobenzylamine | N-butyl-N-(2,5-dichlorobenzyl)sulfamide. |
| N-butyl-3,4-dichlorobenzylamine | N-butyl-N-(3,4-dichlorobenzyl)sulfamide. |
| N-butyl-3,5-dichlorobenzylamine | N-butyl-N-(3,5-dichlorobenzyl)sulfamide. |
| N-butyl-2,3,4-trichlorobenzylamine | N-butyl-N-(2,3,4-trichlorobenzyl)sulfamide. |
| N-butyl-2,3,5-trichlorobenzylamine | N-butyl-N-(2,3,5-trichlorobenzyl)sulfamide. |
| N-butyl-2,4,5-trichlorobenzylamine | N-butyl-N-(2,4,5-trichlorobenzyl)sulfamide. |

Example 9.—N-methyl-N-(2,3,6-trichlorobenzyl)sulfamide

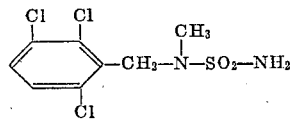

In a flask equipped with a stirrer and a condenser attached to a bubble detector dissolve 11.25 parts (0.05 mole) of N-methyl-2,3,6-trichlorobenzylamine and 7.2 parts (0.075 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 128.5° to 131°.

Replacing the N-methyl-2,3,6-trichlorobenzylamine with an equivalent of each of the following benzylamines results in the preparation, in similar manner, of the corresponding indicated benzylsulfamide:

| Benzylamine | Sulfamide |
| --- | --- |
| N-(2,4-dichloro-6-fluorobenzyl)methylamine. | N-(2,4-dichloro-6-fluorobenzyl)-N-methylsulfamide. |
| N-methyl-2,4,6-trichlorobenzylamine. | N-methyl-N-(2,4,6-trichlorobenzyl)sulfamide. |
| N-methyl-2,3,4,6-tetrachlorobenzylamine. | N-methyl-N-(2,3,4,6-tetrachlorobenzyl)sulfamide. |
| N-methyl-2,3,5,6-tetrachlorobenzylamine. | N-methyl-N-(2,3,5,6-tetrachlorobenzyl)sulfamide. |
| N-methyl-3-methyl-2,4,6-trichlorobenzylamine. | N-methyl-N-(3-methyl-2,4,6-trichlorobenzyl)sulfamide. |
| N-(5-methoxy-2,3,6-trichlorobenzyl)methylamine. | N-(5-methoxy-2,3,6-trichlorobenzyl)-N-methylsulfamide. |
| N-(4-chloro-2,6-dimethylbenzyl)methylamine. | N-(4-chloro-2,6-dimethylbenzyl)-N-methylsulfamide. |

Example 10.—N-2,3,4,5,6-pentachlorobenzylsulfamide

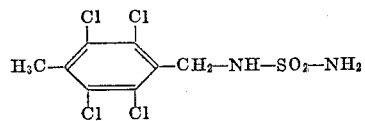

In a flask equipped with a stirrer and a condenser attached to a bubble detector dissolve 2.6 parts of 2,3,4,5,6-pentachlorobenzylamine and 1.8 parts of sulfamide in a solution of 50 parts by volume of water and 125 parts by volume of ethanol. Stir and reflux the resulting solution until gassing is no longer detected in the bubble detector. Remove the water and ethanol in vacuo on a rotary evaporator to obtain the title compound, M.P. 204° to 206°.

Example 11.—N-2,3,5,6-tetrachloro-4-methylbenzylsulfamide

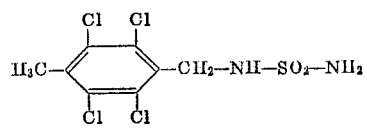

In a flask equipped with a stirrer and a condenser attached to a bubble detector dissolve 10.4 parts (0.04 mole) of 2,3,5,6-tetrachloro-4-methylbenzylamine and 7.7 parts (0.08 mole) of sulfamide in a solution of 150 parts by volume of water and 150 parts by volume of ethanol. Stir and reflux the resulting solution until gassing is no longer detected in the bubble detector. Remove the water and ethanol in vacuo on a rotary evaporator to obtain the title compound, M.P. >215°.

Example 12.—N-2,4,5-trichlorobenzylsulfamide

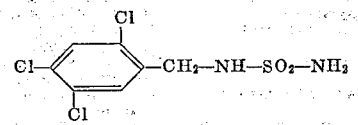

In a flask equipped with a stirrer and a condenser attached to a bubble detector dissolve 8 parts (0.04 mole) of 2,4,5-trichlorobenzylamine and 9.6 parts (0.010 mole) of sulfamide in a solution of 50 parts by volume of water and 100 parts by volume of ethanol. Stir and reflux the resulting solution until gassing is no longer detected in the bubble detector. Remove the water and ethanol in vacuo on a rotary evaporator to obtain the title compound, M.P. 151° to 152°.

Example 13.—N-methyl-N-2,6-dichlorobenzylsulfamide

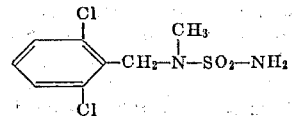

In a flask equipped with a stirrer and a condenser attached to a bubble detector dissolve 9.5 parts (0.05 mole) of N-methyl-2,6-dichlorobenzylamine and 5.8 parts (0.06 mole) of sulfamide in 100 parts by volume of pyridine. Stir and reflux the resulting solution until gassing is no longer detected in the bubble detector. Remove the pyridine in vacuo on a rotary evaporator to obtain the title compound, M.P. 148° to 148.5°.

Example 14.—N-2,4-dichlorobenzylsulfamide

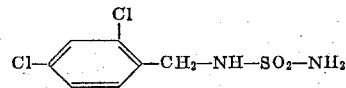

In a flask equipped with a stirrer, condenser and dropping funnel place 150 parts by volume of water, 4.8 parts (0.05 mole) of sulfamide and 8.8 parts (0.05 mole) of 2,4-dichlorobenzylamine. Stir and bring the obtained mixture to reflux. Then add ethanol dropwise thereto until a clear solution results. Continue stirring and refluxing for ten hours. Cool the thus-refluxed material to room temperature and filter off the crystalline product formed. Crystallize said product from methanol/water to obtain the title compound, M.P. 129° to 130°.

Replacing the 2,4-dichlorobenzylamine with an equivalent of each of the following benzylamines results in the preparation, in similar manner, of the corresponding indicated benzylsulfamide:

| Benzylamine | Sulfamide |
| --- | --- |
| 2-chloro-4,5-difluorobenzylamine | N-2-chloro-4,5-difluorosulfamide. |
| 2-butyl-3-chlorobenzylamine | N-2-butyl-3-chlorobenzylsulfamide |
| 4-chloro-2-methoxybenzylamine | N-4-chloro-2-methoxybenzylsulfamide. |
| 2,3-dichlorobenzylamine | N-2,3-dichlorobenzylsulfamide. |
| 2,4-dichloro-3-ethoxy-5-fluorobenzylamine. | N-2,4-dichloro-3-ethoxy-5-fluorobenzylsulfamide. |
| 2,5-dichloro-3-fluorobenzylamine | N-2,5-dichloro-3-fluorobenzylsulfamide. |
| 2,6-dichloro-4-propoxybenzylamine | N-2,6-dichloro-4-propoxybenzylsulfamide. |
| 2,4,6-trimethylbenzylamine | N-2,4,6-trimethylbenzylsulfamide. |

Example 15.—N-2-chlorobenzylsulfamide

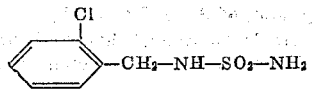

In a flask equipped with a stirrer, condenser and dropping funnel place 300 parts by volume of water, 9.6 parts (0.10 mole) of sulfamide and 14.1 parts (0.10 mole) of 2-chlorobenzylamine. Stir and bring the obtained mixture to reflux. Then add ethanol dropwise thereto until a clear solution results. Continue stirring and refluxing for ten hours. Cool the thus-refluxed material to room temperature and filter off the crystalline product formed. Crystallize said product from ethanol to obtain the title compound, M.P. 95° to 96°.

Replacing the 2-chlorobenzylamine with an equivalent of each of the following benzylamines results in the preparation, in similar manner, of the corresponding indicated benzylsulfamide:

| Benzylamine | Sulfamide |
| --- | --- |
| 2,3,4-trichlorobenzylamine | N-2,3,4-trichlorobenzylsulfamide. |
| 2,3,5-trichlorobenzylamine | N-2,3,5-trichlorobenzylsulfamide. |
| 5-isopropyl-2,3,6-trichlorobenzylamine | N-5-isopropyl-2,3,6-trichlorobenzylsulfamide. |
| 6-butoxy-2,4,5-trichlorobenzylamine | N-6-butoxy-2,4,5-trichlorobenzylsulfamide. |
| 2,4,6-trichlorobenzylamine | N-2,4,6-trichlorobenzylsulfamide. |
| 4-isopropyl-2,5,6-trichlorobenzylamine | N-4-isopropyl-2,5,6-trichlorobenzylsulfaminde. |
| 3,4-dichlorobenzylamine | N-3,4-dichlorobenzylsulfamide. |

Example 16.—N-2,3,6-trichlorobenzylsulfamide

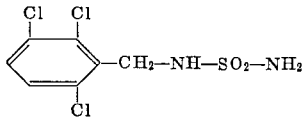

In a flask equipped with a stirrer, condenser and dropping funnel place 80 parts by volume of water, 3.8 parts (0.04 mole) of sulfamide and 4.2 parts (0.02 mole) of 2,3,6-trichlorobenzylamine. Stir and bring the obtained mixture to reflux. Then add ethanol dropwise thereto until a clear solution results. Continue stirring and refluxing for ten hours. Cool the thus-refluxed material to room temperature and filter off the crystalline product formed. Crystallize said product from ethanol to obtain the title compound, M.P. 117° to 119°.

Replacing the 2,3,6-trichlorobenzylamine with an equivalent of each of the following benzylamines results in the preparation, in similar manner, of the corresponding indicated benzylsulfamide:

| Benzylamine | Sulfamide |
| --- | --- |
| 3,5-dichloro-4-propylbenzylamine | N-3,5-dichloro-4-propylbenzylsulfamide. |
| 3,6-dichloro-5-ethyl-2-fluorobenzylamine | N-3,6-dichloro-5-ethyl-2-fluorobenzylsulfamide. |
| 6-methyl-3,4,5-trichlorobenzylamine | N-6-methyl-3,4,5-trichlorobenzylsulfamide. |

Example 17.—N-3,4-dichlorobenzylsulfamide

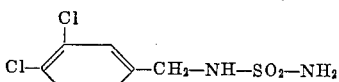

In a flask equipped with a stirrer, condenser and dropping funnel place 150 parts by volume of water, 9.6 parts (0.10 mole) of sulfamide and 11.0 parts (0.062 mole) of 3,4-dichlorobenzylamine. Stir and bring the obtained mixture to reflux. Then add ethanol dropwise thereto until a clear solution results. Continue stirring and refluxing for ten hours. Cool the thus-refluxed material to room temperature and filter off the crystalline product formed. Crystallize said product from ethanol to obtain the title compound, M.P. 106° to 107°.

Replacing the 3,4-dichlorobenzylamine with an equivalent of each of the following benzylamines results in the preparation, in similar manner, of the corresponding indicated benzylsulfamide:

| Benzylamine | Sulfamide |
| --- | --- |
| 2,3,4,5-tetrachlorobenzylamine | N-2,3,4,5-tetrachlorobenzylsulfamide. |
| 2,3,5,6-tetrachlorobenzylamine | N-2,3,5,6-tetrachlorobenzylsulfamide. |
| 2,3,4,6-tetrachlorobenzylamine | N-2,3,4,6-tetrachlorobenzylsulfamide. |

Example 18.—N-2,5-dichloro-4-methylbenzylsulfamide

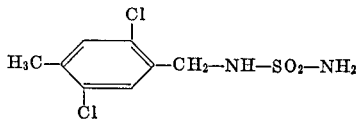

In a flask equipped with a stirrer, condenser and dropping funnel place 75 parts by volume of water, 6.0 parts (0.05 mole) of sulfamide and 6.3 parts (0.033 mole) of 2,5-dichloro-4-methylbenzylamine. Stir and bring the obtained mixture to reflux. Then add ethanol dropwise thereto until a clear solution results. Continue stirring and refluxing for ten hours. Cool the thus-refluxed material to room temperature and filter off the crystalline product formed. Crystallize said product from ethanol to obtain the title compound, M.P. 107° to 108°.

Replacing the 2,5-dichloro-4-methylbenzylamine with an equivalent of each of the following benzylamines results in the preparation, in similar manner, of the corresponding indicated benzylsulfamide:

| Benzylamine | Sulfamide |
| --- | --- |
| 3-chlorobenzylamine | N-3-chlorobenzylsulfamide. |
| 4-chlorobenzylamine | N-4-chlorobenzylsulfamide. |
| 2,5-dichlorobenzylamine | N-2,5-dichlorobenzylsulfamide. |
| 2,6-dichlorobenzylamine | N-2,6-dichlorobenzylsulfamide. |

Example 19.—N-2-chloro-6-fluorobenzylsulfamide

In a flask equipped with a stirrer, condenser and dropping funnel place 75 parts by volume of water, 9.6 parts (0.10 mole) of sulfamide and 8.0 parts (0.05 mole) of 2-chloro-6-fluorobenzylamine. Stir and bring the obtained mixture to reflux. Then add ethanol dropwise thereto until a clear solution results. Continue stirring and refluxing for ten hours. Cool the thus-refluxed material to room temperature and filter off the crystalline product formed. Crystallize said product from ethanol to obtain the title compound.

Replacing the 2-chloro-6-fluorobenzylamine with an equivalent of each of the following benzylamines results in the preparation, in similar manner, of the corresponding indicated benzylsulfamide:

| Benzylamine | Sulfamide |
| --- | --- |
| 3,5-dichlorobenzylamine | N-3,5-dichlorobenzylsulfamide. |
| 3,4,5-trichlorobenzylamine | N-3,4,5-trichlorobenzylsulfamide. |

Example 20.—(+)-N-methyl-N-α-phenethylsulfamide

In a flask equipped with a stirrer and a condenser attached to a bubble detector dissolve 10.0 parts (0.075 mole) of (+)-N-methyl-α-phenethylamine and 8.8 parts (0.092 mole) of sulfamide in 180 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 86°

$$\alpha_{578}^{22} = +22.3°$$

(c.=0.234; 95% ethanol).

Replacing the (+)-N-methyl-α-phenethylamine with an equivalent of each of the following amines results in the preparation, in similar manner, of the corresponding indicated sulfamide:

| Amine | Sulfamide |
| --- | --- |
| (+)-N-(α-methylbenzyl)-N-propylamine. | (+)-N-(α-methylbenzyl)-N-propylsulfamide. |
| (+)-N-(α-ethyl-2-fluoro-4,5-methylenedioxybenzyl)-N-methylamine. | (+)-N-(α-ethyl-2-fluoro-4,5-methylenedioxybenzyl)-N-methylsulfamide. |
| (±)-N-(3-chloro-α-propylbenzyl)-N-ethylamine. | (±)-N-(3-chloro-α-propylbenzyl)-N-ethylsulfamide. |
| (+)-N-(4-bromo-α-butylbenzyl)-N-methylamine. | (+)-N-(4-bromo-α-butylbenzyl)-N-methylsulfamide. |
| (+)-N-(α,3-dimethylbenzyl)-N-methylamine. | (+)-N-(α,3-dimethylbenzyl)-N-methylsulfamide. |
| (±)-N-(3,4-difluoro-α-ethylbenzyl)-N-ethylamine. | (±)-N-(3,4-difluoro-α-ethylbenzyl)-N-ethylsulfamide. |
| (±)-N-(2-bromo-4,5-methylenedioxy-α-propylbenzyl)-N-propylamine. | (±)-N-(2-bromo-4,5-methylenedioxy-α-propylbenzyl)-N-propylsulfamide. |
| (+)-N-(3-bromo-α-butylbenzyl)-N-isopropylamine. | (+)-N-(3-bromo-α-butylbenzyl)-N-isopropylsulfamide. |
| (+)-N-(2-ethylmethylamino-α-phenyl-4-propoxybenzyl)-N-propylamine. | (+)-N-(2-ethylmethylamino-α-phenyl-4-propoxybenzyl)-N-propylsulfamide. |
| (−)-N-(α-benzyl-3-isopropoxybenzyl)-N-butylamine. | (−)-N-(α-benzyl-3-isopropoxybenzyl)-N-butylsulfamide. |

Example 21.—(+)-N-α-phenethylsulfamide

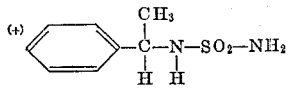

In a flask equipped with a stirrer and a condenser attached to a bubble detector dissolve 7.4 parts (0.06 mole) of (+)-α-phenethylamine and 11.7 parts (0.14 mole) of sulfamide in 150 parts by volume of water. Stir and reflux the resulting solution until gassing is no longer detected in the bubble detector. Remove the solvent (water) in vacuo on a rotary evaporator to obtain the title compound as a viscous liquid $$\alpha_{578}^{22} = +37.6$$

(c.=0.274; 95% ethanol).

Replacing the (+)-α-phenethylamine with an equivalent of each of the following amines results in the preparation, in similar manner, of the corresponding indicated sulfamide:

| Amine | Sulfamide |
| --- | --- |
| (+)-(4-butyl-α-methylbenzyl)amine | (+)-N-(4-butyl-α-methylbenzyl)-sulfamide. |
| (−)-(2-butoxy-4-chloro-α-ethyl-5-methylbenzyl)amine. | (−)-(2-N-butoxy-4-chloro-α-ethyl-5-methylbenzyl)sulfamide. |
| (±)-(5-diethylamino-3-methoxy-2-methyl-α-propylbenzyl)amine. | (±)-N-(5-diethylamino-3-methoxy-2-methyl-α-propylbenzyl)sulfamide. |
| (+)-[α-butyl-2,4-di(dimethylamino)-3-ethylbenzyl]amine. | (+)-N-[α-butyl-2,4-di(dimethylamino)-3-ethylbenzyl]sulfamide. |
| (−)-(α-benzyl-5-bromo-2-methoxy-4-propylbenzyl)amine. | (−)-N-(α-benzyl-5-bromo-methoxy-4-propylbenzyl)sulfamide. |
| (±)-(2-chloro-3-ethoxy-5-isopropyl-α-phenylbenzyl)amine. | (±)-N-(2-chloro-3-ethoxy-5-isopropyl-α-phenylbenzyl)sulfamide. |

Example 22.—(−)-N-(α-methylbenzyl)-N-methylsulfamide

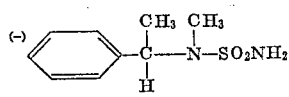

In a flask equipped with a stirrer and a condenser attached to a bubble detector dissolve 15.0 parts (0.11 mole) of (−)-N-methyl-α-phenethylamine and 11.4 parts (0.12 mole) of sulfamide in 220 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 86° to 90°, $$\alpha_{578}^{22} = -27.4°$$

(c.=0.2542; 95% ethanol).

Replacing the (−)-N-methyl-α-phenethylamine with an equivalent of each of the following amines results in the preparation, in similar manner, of the corresponding indicated sulfamide:

| Amine | Sulfamide |
| --- | --- |
| (−)-N-(5-chloro-2,4-dimethoxy-α-methylbenzyl)-N-butylamine. | (−)-N-(5-chloro-2,4-dimethoxy-α-methylbenzyl)-N-butylsulfamide. |
| (−)-N-(α-benzyl-4-trifluoromethylbenzyl)-N-methylamine. | (−)-N-(α-benzyl-4-trifluoromethylbenzyl)-N-methylsulfamide. |
| (±)N-(3-ethylmethylamino-α-propyl-benzyl)-N-methylamine. | (±)-N-(3-ethylmethylamino-α-benzyl)-N-methylsulfamide. |
| (−)-N-(α-butyl-4,5-methylenedioxy-3-trifluoromethylbenzyl)-N-ethylamine. | (−)-N-(α-butyl-4,5-methylenedioxy-3-trifluoromethylbenzyl)-N-ethylsulfamide. |
| (−)-N-(α-methylbenzyl)-N-propylamine. | (−)-N-(α-methylbenzyl)-N-propylsulfamide. |
| (±)-N-(2,5-ditrifluoromethyl-α-ethylbenzyl)-N-isopropylamine. | (±)-N-(2,5-ditrifluoromethyl-α-ethylbenzyl)-N-isoproplysulfamide. |
| (−)-N-butyl-N-[α-(p-tolyl)benzyl]-amine. | (−)-N-butyl-N-[α-(p-tolyl)benzyl]-sulfamide. |
| (+)-N-(α-butyl-3,5-dichlorobenzyl)-N-butylamine. | (+)-N-(α-butyl-3,5-dichlorobenzyl)-N-butylsulfamide. |

Example 23.—N-(α-benzylbenzyl)sulfamide

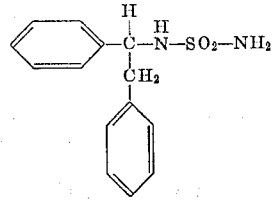

In a flask equipped with a stirrer and a condenser attached to a detector dissolve 19.7 parts (0.1 mole) of 1,2-diphenylethylamine and 9.6 parts (0.1 mole) sulfamide in a solution of 200 parts by volume of water and 75 parts by volume of ethanol. Stir and reflux the resulting solution until gassing is no longer detected in the bubble detector. Remove the solvent (water and ethanol) in vacuo on a rotary evaporator. Crystallize the viscous residue from methanol/water to obtain the title compound, M.P. 108° to 110°.

Replacing the 1,2-diphenylethylamine with an equivalent of each of the following amines results in the preparation, in similar manner, of the corresponding indicated sulfamide:

| Amine | Sulfamide |
| --- | --- |
| (+)-α-(o-tolyl)phenethylamine. | (+)-α-(tolyl)phenethylsulfamide. |
| (−)-N-[2-butyl-4-ethoxy-α-(3-ethylphenyl)phenethyl]-N-methylamine. | (−)-N-[2-butyl-4-ethoxy-α-(3-ethylphenyl)phenethyl]-N-methylsulfamide. |
| (±)-N-[3-chloro-5-methoxy-α-(2-fluoro-4-propylphenyl)phenethyl]-N-ethylamine. | (±)-N-[3-chloro-5-methoxy-α-(2-fluoro-4-propylphenyl)-phenethyl]-N-ethylsulfamide. |
| (+)-N-[α-(2-ethoxy-5-isopropylphenyl)-3-methoxyphenethyl]-N-propylamine. | (+)-N-[α-(2-ethoxy-5-isopropylphenyl)-3-methoxyphenethyl]-N-propylsulfamide. |
| (−)-N-[4-chloro-α-(3-propoxyphenyl)-phenethyl]-N-isopropylamine. | (−)-N-[4-chloro-α-(3-propoxyphenyl)phenethyl]-N-isopropylsulfamide. |
| (±)-N-[α-(3-bromo-4-isopropoxyphenyl)-2-fluorophenethyl]-N-butylamine. | (±)-N-[α-(3-bromo-4-isopropoxyphenyl)-2-fluorophenethyl]-N-butylsulfamide. |
| (+)-α-(5-butoxy-2-dimethylaminophenyl)-3-dimethylamino-phenethylamine. | (+)-N-[α-(5-butoxy-2-dimethylaminophenyl)-3-dimethylaminophenethyl]sulfamide. |

Example 24.—Benzhydrylsulfamide

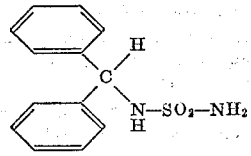

In a flask equipped with a stirrer and a condenser attached to a bubble detector dissolve 18.3 parts (0.10 mole) of benzhydrylamine and 10.5 parts (0.11 mole) of sulfamide in a solution of 250 parts by volume of water and 100 parts by volume of ethanol. Stir and reflux the resulting solution until gassing is no longer detected in the bubble detector. Remove the solvent water and ethanol in vacuo on a rotary evaporator. Crystallize the viscous residue from methanol/water to obtain the title compound, M.P. 129° to 131°.

Replacing the benzhydrylamine with an equivalent of each of the following amines results in the preparation, in similar manner, of the corresponding indicated sulfamide:

| Amine | Sulfamide |
| --- | --- |
| (±)-N-(2,4-ditrifluoromethyl-3'-ethylbenzhydryl-α)-N-ethylamine. | (±)-N-(2,4-ditrifluoromethyl-3'-ethyl-benzhydryl)-N-ethylsulfamide. |
| (−)-N-(2-bromo-4-fluoro-3-trifluoromethyl-2'-methoxybenzhydryl)-N-methylamine. | (−)-N-(2-bromo-4-fluoro-3-trifluoromethyl-2'-methoxybenzhydryl)-N-methylsulfamide. |
| (+)-3-fluorobenzhydrylamine. | (+)-3-fluorobenzhydrylsulfamide. |
| (±)-N-(2-chlorobenzhydryl)-N-butylamine. | (±)-N-(2-chlorobenzhydryl)-N-butylsulfamide. |
| (−)-N-(3,4-dichlorobenzhydryl)-N-isopropylamine. | (−)-N-(3,4-dichlorobenzhydryl)-N-isopropylsulfamide. |
| (+)-N-(4-methylbenzhydryl)-N-propylamine. | (+)-N-(4-methylbenzhydryl)-N-propylsulfamide. |
| (±)-N-(3-bromo-4'-diethylaminobenzhydryl)-N-ethylamine. | (±)-N-(3-bromo-4'-diethylaminobenzhydryl)-N-ethylsulfamide. |
| (−)-N-(3-ethylmethylamino-4'-trifluoromethylbenzhydryl)-N-methylamine. | (−)-N-(3-ethylmethylamino-4'-trifluoromethylbenzhydryl)-N-methylsulfamide. |

Example 25.—N-sulfamoyl-N'-p-chlorobenzhydrylpiperazine

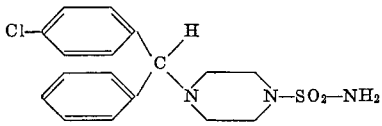

In a flask equipped with a stirrer and a condenser attached to a bubble detector dissolve 14.4 parts (0.05 mole) of 1-(p-chlorobenzhydryl)piperazine and 5.8 parts (0.06 mole) of sulfamide in 75 parts by volume of pyridine. Stir and reflux the resulting solution until gassing is no longer detected in the bubble detector. Remove the solvent (pyridine) in vacuo on a rotary evaporator. Crystallize the viscous residue from methanol/water to obtain the title compound, M.P. 179° to 181°.

Replacing the 1-(p-chlorobenzhydryl)piperazine with an equivalent of each of the following amines results in the preparation, in similar manner, of the corresponding indicated sulfamide VI wherein Y is either hydrogen or lower alkyl:

| Amine | Sulfamide |
| --- | --- |
| 1-(p-butylbenzyl)piperazine. | N-sulfamoyl-N-p-butylbenzylpiperazine. |
| (−)-1-2-butoxy-4-chloro-α-ethyl-5-methylbenzyl)piperazine. | (−)-N-sulfamoyl-N'-(2-butoxy-4-chloro-α-ethyl-5-methylbenzyl)piperazine. |
| (±)-1-(5-diethylamino-3-methoxy-2-methyl-α-propylbenzyl)piperazine. | (±)-N-sulfamoyl-N'-(5-diethylamino-3-methoxy-2-methyl-α-propylbenzyl)piperazine. |
| (+)-1-[α-butyl-2,4-di(dimethylamino)-3-ethylbenzyl]piperazine. | (+)-N-sulfamoyl-N'-[α-butyl-2,4-di(dimethylamino)-3-ethylbenzyl]piperazine. |
| (−)-1-(5-bromo-2-methoxy-α-methyl-4-propylbenzyl)piperazine. | (−)-N-sulfamoyl-N'-(5-bromo-2-methoxy-α-methyl-4-propylbenzyl)piperazine. |
| (±)-1-(2-chloro-3-ethoxy-α-ethyl-5-isopropylbenzyl)piperazine. | (±)-N-sulfamoyl-N'-(2-chloro-3-ethoxy-α-ethyl-5-isopropylbenzyl)piperazine. |
| 1-(2-ethylmethylamino-4-propoxybenzyl)piperazine. | N-sulfamoyl-N'-(2-ethylmethylamino-4-propoxybenzyl)piperazine. |
| (−)-L-(α-butyl-3-isopropoxybenzyl)piperazine. | N-sulfamoyl-N'-(α-butyl-3-isopropoxybenzyl)piperazine. |
| (±)-1-(3-dimethylamino-α-methyl-4,5-methylenedioxybenzyl)piperazine. | (±)-N-sulfamoyl-N'-(3-dimethylamino-α-methyl-4,5-methylenedioxybenzyl)piperazine. |
| 1-(2-methyl-4,5-methylenedioxybenzyl)piperazine. | N-sulfamoyl-N'-(2-methyl-4,5-methylene-dixoybenzyl)piperazine. |
| (−)-1-(3-methoxy-4,5-methylenedioxy-α-propyl-2-trifluoromethylbenzyl)piperazine. | (−)-N-sulfamoyl-N'-(3-methoxy-4,5-methylenedioxy-α-propyl-2-trifluoromethylbenzyl)piperazine. |
| (±)-1-(α-butyl-3-fluoro-4,5-methylenedioxybenzyl)piperazine. | (±)-N-sulfamoyl-N'-(α-butyl-3-fluoro-4,5-methylenedioxybenzyl)piperazine. |

Exemplary sulfamides VI wherein Y is either a benzyl or a phenyl radical are similarly prepared by replacing said 1-(p-chlorobenzhydryl)piperazine with an equivalent of each of the following piperazines:

| Pyperazine | Sulfamide |
| --- | --- |
| (+)-1-([α-(o-tolyl)phenethyl]piperazine. | (+)-N-sulfamoyl-N'-[α-(o-tolyl)-phenethyl]piperazine. |
| (+)-1-(o-methylbenzhydryl)piperazine. | (+)-N-sulfamoyl-N'-(o-methylbenzhydryl)piperazine. |
| (−)-1-[α-(2-butyl-4-ethoxyphenyl)-3-ethylphenethyl]piperazine. | (−)-N-sulfamoyl-N'-[α-(2-butyl-4-ethoxyphenyl)-3-ethylphenethyl]piperazine. |
| (−)-1-(2-butyl-4-ethoxy-3'-ethylbenzhydryl)piperazine. | (−)-N-sulfamoyl-N'-(2-butyl-4-ethoxy-3'-ethylbenzhydryl)-piperazine. |
| (±)-1-[α-(3-chloro-5-methoxyphenyl)-4-propylphenethyl]piperazine. | (±)-N-sulfamoyl-N'-[α-(3-chloro-5-methoxyphenyl)-4-propylphenethyl]piperazine. |
| (±)-1-(3-chloro-5-methoxy-4'-propylbenzhydryl)piperazine. | (±)-N-sulfamoyl-N'-(3-chloro-5-methoxy-4'-propylbenzhydryl)-piperazine. |
| (+)-1-[α-(3-methoxyphenyl)-2-ethoxy-5-isopropylphenethyl]piperazine. | (+)-N-sulfamoyl-N'-[α-(3-methoxyphenyl)-2-ethoxy-5-isopropylphenethyl]piperazine. |
| (+)-1-(2-ethoxy-5-isopropyl-3-methoxybenzhydryl)piperazine. | (+)-N-sulfamoyl-N'-(2-ethoxy-5-isopropyl-3-methoxybenzhydryl)-piperazine. |
| (−)-1-[4-chloro-α-(3'-propoxyphenyl)-phenethyl]piperazine. | (−)-N-sulfamoyl-N'-[4-chloro-α-(3'-propoxyphenyl)phenethyl]-piperazine. |
| (−)-1-(4-chloro-3'-propoxybenzhydryl)piperazine. | (−)-N-sulfamoyl-N'-(4-chloro-3'-propoxy-benzhydryl)piperazine. |
| (±)-1-[α-(3-bromo-4-isopropoxyphenyl)-2-fluorophenethyl]piperazine. | (−)-N-sulfamoyl-N'-[α-(3-bromo-4-isopropoxyphenyl)-2-fluorophenethyl]piperazine. |
| (±)-1-(3-bromo-2'-fluoro-4-isopropoxybenzhydryl)piperazine. | (±)-N-sulfamoyl-N'-[α-(3-bromo-2'-fluoro-4-isopropoxybenzhydryl)-piperazine. |
| (+)-1-[α-(5-butoxy-2-dimethylaminophenyl)-3-dimethylaminophenethyl]piperazine. | (+)-N-sulfamoyl-N'-[α-(5-butoxy-2-dimethylaminophenyl)-3-dimethylaminophenethyl]piperazine. |
| (+)-1-(5-butoxy-2,3'-dimethylaminobenzhydryl)piperazine. | (+)-N-sulfamoyl-N'-(5-butoxy-2,3'-dimethylaminobenzhydryl)piperazine. |
| (−)-1-[α-(3-ethylmethylaminophenyl)-4-trifluoromethylphenethyl]piperazine. | (−)-N-sulfamoyl-N'-[α-(3-ethylmethylaminophenyl)-4-trifluoromethylphenethyl]piperazine. |
| (−)-1-(3-ethylmethylamino-4'-trifluoromethylbenzhydryl)piperazine. | (−)-N-sulfamoyl-N'-(3-ethylmethylamino-4'-trifluoromethylbenzhydryl)piperazine. |
| (±)-1-[3-bromo-α-(4-diethylaminophenyl)phenethyl]piperazine. | (±)-N-sulfamoyl-N'-[3-bromo-α-(4-diethylaminophenyl)phenethyl]piperazine. |
| (±)-1-(3-bromo-4'-diethylaminobenzhydryl)piperazine. | (±)-N-sulfamoyl-N'-(3-bromo-4'-diethylaminobenzhydryl)piperazine. |
| (±)-1-(4-methyl-α-phenylphenethyl)piperazine. | (+)-N-sulfamoyl-N'-methyl-α-phenyl-phenethyl)piperazine. |
| (+)-1-(p-methylbenzhydryl)piperazine. | (+)-N-sulfamoyl-N'-(p-methylbenzhydryl)piperazine. |
| (−)-1-[α-(3,4-dichlorophenyl)phenethyl]piperazine. | (−)-N-sulfamoyl-N'-[α-(3,4-dichlorophenyl)phenethyl]piperazine. |
| (−)-1-(3,4-dichlorobenzhydryl)-piperazine. | (−)-N-sulfamoyl-N'-(3,4-dichloro-benzhydryl)piperazine. |
| (±)-1-[α-(o-chlorophenyl)phenethyl]piperazine. | (±)-N-sulfamoyl-N'-[α-(o-chlorophenyl)-phenyethyl]piperazine. |
| (±)-1-(o-chlorobenzhydryl)piperazine. | (±)-N-sulfamoyl-N'-(o-chlorobenzhydryl)piperazine. |
| (+)-1-[α-(m-fluorophenyl)phenethyl]piperazine. | (+)-N-sulfamoyl-N'-[α-m-fluorophenyl)-phenethyl]piperazine. |
| (−)-1-[α-(2-bromo-4-fluoro-3-trifluoromethylphenyl)-2-methoxyphenethyl]piperazine. | (−)-N-sulfamoyl-N'-[α-(2-bromo-4-fluoro-3-trifluoromethylphenyl)-2-methoxyphenethyl]piperazine. |
| (−)-1-(2-bromo-4-fluoro-2'-methoxy-3-trifluoromethylbenzhydryl)-piperazine. | (−)-N-sulfamoyl-N'-(2-bromo-4-fluoro-2'-methoxy-3-trifluoromethylbenzhydryl)piperazine. |
| (±)-1-[α-(2,4-ditrifluoromethylphenyl)-3-ethylphenethyl]-piperazine. | (±)-N-sulfamoyl-N'-[α-(2,4-ditrifluoromethylphenyl)-3-ethyl-phenethyl]piperazine. |
| (±)-1-(2,4-ditrifluoromethyl-3'-ethylbenzhydryl)piperazine. | (±)-N-sulfamoyl-N'-(2,4-ditrifluoromethyl-3'-ethylbenzhydryl)piperazine. |

It is thought that the invention and its advantages will be understood from the foregoing description. It is apparent that various changes may be made in the final products without departing from the spirit and scope of the invention or sacrificing its material advantages. The products hereinbefore described are merely exemplary of every compound within the scope of Formula I.

What is claimed is:

1. A pharmaceutically acceptable compound of the formula

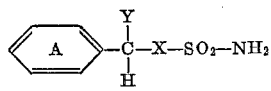

wherein

Y is a member selected from the group consisting of a hydrogen atom and R, the member being a hydrogen atom when X is —N(lower alkyl);

R is a member selected from the group consisting of straight chain alkyl having from 1 to 4 carbon atoms, a phenyl radical having from zero to four substituents on the phenyl ring and a benzyl radical having from zero to four substituents on the benzene ring; the ring of both the phenyl radical and the benzyl radical being unsubstituted in the 6-position and each substituent being selected from the group consisting of lower alkyl, lower alkoxy, di-(lower)alkylamino, fluoro, chloro, bromo, trifluoromethyl (providing that a plurality of trifluoromethyl groups are not ortho to each other) and, together with its counterpart on an adjacent ring carbon atom, methylenedioxy;

ring A has from zero to five substituents, but has at least one chloro substituent when Y is a hydrogen atom and X is —NH—; it is unsubstituted in the 6-position when Y is other than a hydrogen atom and when X is other than —NH— or —N(CH$_3$)—; each substituent being a member selected from the group consisting of lower alkyl, lower alkoxy, di-(lower)alkylamino, fluoro, chloro, bromo, trifluoromethyl (providing that a plurality of trifluoromethyl groups are not ortho to each other) and, together with its counterpart on an adjacent ring carbon atom, methylenedioxy;

X is a member selected from the group consisting of —N(R')— and

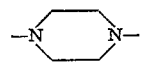

and

R' is a member selected from the group consisting of a hydrogen atom and lower alkyl.

2. A compound according to claim 1 wherein ring A has at least one chloro substituent.

3. A compound according to claim 1 wherein Y is a hydrogen atom and X is —NH—.

4. The compound according to claim 3 which is N-2,4-dichlorobenzylsulfamide.

5. The compound according to claim 3 which is N-2-chlorobenzylsulfamide.

6. The compound according to claim 3 which is N-2,3,4,5,6-pentachlorobenzylsulfamide.

7. The compound according to claim 3 which is N-2,3,6-trichlorobenzylsulfamide.

8. The compound according to claim 3 which is N-2,3,5,6-tetrachloro-4-methylbenzylsulfamide.

9. The compound according to claim 3 which is N-3,4-dichlorobenzylsulfamide.

10. The compound according to claim 3 which is N-2,4,5-trichlorobenzylsulfamide.

11. The compound according to claim 3 which is N-2,5-dichloro-4-methylbenzylsulfamide.

12. The compound according to claim 3 which is N-2-chloro-6-fluorobenzylsulfamide.

13. The compound according to claim 3 which is N-2,6-dichlorobenzylsulfamide.

14. A compound according to claim 1 wherein Y is R, X is —NH— and ring A is substituted in the 6-position.

15. A compound according to claim 14 wherein R is lower alkyl.

16. The compound according to claim 15 which is (+)-N-α-phenethylsulfamide.

17. A compound according to claim 14 wherein R is a phenyl radical.

18. The compound according to claim 17 which is benzhydrylsulfamide.

19. A compound according to claim 14 wherein R is a benzyl radical.

20. The compound according to claim 19 which is N-(α-benzylbenzyl)sulfamide.

21. A compound according to claim 1 wherein X is —N(lower alkyl)— and ring A is unsubstituted in the 6-position.

22. The compound according to claim 21 which is N-isopropyl-N-benzylsulfamide.

23. The compound according to claim 21 which is N-methyl-N-(4-methoxybenzyl)sulfamide.

24. The compound according to claim 21 which is N-methyl-N-(4-chlorobenzyl)sulfamide.

25. The compound according to claim 21 which is N-methyl-N-(3,4-methylenedioxybenzyl)sulfamide.

26. The compound according to claim 21 which is N-methyl-N-benzylsulfamide.

27. The compound according to claim 21 which is N-methyl-N-(2,4-dichlorobenzyl)sulfamide.

28. The compound according to claim 21 which is N-methyl-N-o-chlorobenzylsulfamide.

29. The compound according to claim 21 which is N-methyl-N-(3,4-dichlorobenzyl)sulfamide.

30. A compound according to claim 1 wherein Y is a hydrogen atom, X is —N(CH$_3$)— and ring A is substituted in at least the 2- and the 6-positions and has at most two additional substituents.

31. The compound according to claim 30 which is N-methyl-N-2,6-dichlorobenzylsulfamide.

32. The compound according to claim 30 which is N-methyl-N-(2,3,6-trichlorobenzyl)sulfamide.

33. A compond according to claim 1 wherein X is

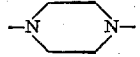

and ring A is unsubstituted in the 6-position.

34. A compound according to claim 33 wherein Y is a hydrogen atom.

35. A compound according to claim 33 wherein Y is lower alkyl.

36. A compound according to claim 33 wherein Y is a phenyl radical.

37. A compound according to claim 36 which is N-sulfamoyl-N'-p-chlorobenzhydrylpiperazine.

38. A compound according to claim 33 wherein Y is a benzyl radical.

References Cited

FOREIGN PATENTS 947,554    8/1956    Germany.

HENRY R. JILES, *Primary Examiner.*